US012669383B2

(12) United States Patent (10) Patent No.: US 12,669,383 B2
Matsushima et al. (45) Date of Patent: Jun. 30, 2026

(54) TEMPERATURE SENSOR ASSEMBLY

(71) Applicant: Yazaki Corporation, Tokyo (JP)

(72) Inventors: Tomohiro Matsushima, Makinohara (JP); Kenta Tanaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 279 days.

(21) Appl. No.: 18/612,413

(22) Filed: Mar. 21, 2024

(65) Prior Publication Data

US 2024/0344894 A1 Oct. 17, 2024

(30) Foreign Application Priority Data

Apr. 17, 2023 (JP) ................................. 2023-067130

(51) Int. Cl.
*G01K 1/143* (2021.01)
*G01K 7/22* (2006.01)

(52) U.S. Cl.
CPC ............... *G01K 1/143* (2013.01); *G01K 7/22* (2013.01)

(58) Field of Classification Search
CPC .................................. G01K 1/143; G01K 7/22
See application file for complete search history.

(56) References Cited

U.S. PATENT DOCUMENTS

| | | | | |
|---|---|---|---|---|
| 2018/0342775 A1* | 11/2018 | Sei | ...................... | H01M 50/507 |
| 2018/0364108 A1* | 12/2018 | Tanaka | ...................... | G01K 7/22 |
| 2020/0014083 A1* | 1/2020 | Matsushima | ............ | G01K 1/14 |
| 2022/0158310 A1* | 5/2022 | Matsushima | ....... | H01M 50/519 |

FOREIGN PATENT DOCUMENTS

| | | | |
|---|---|---|---|
| JP | 2009250768 A | * | 10/2009 |
| JP | 2011-17638 A | | 1/2011 |
| JP | 2012154901 A | * | 8/2012 |

* cited by examiner

*Primary Examiner* — Mirellys Jagan
(74) *Attorney, Agent, or Firm* — Sughrue Mion, PLLC

(57) ABSTRACT

A temperature sensor includes an FPC, a surface-mounted chip thermistor on the FPC, a metallic heat receiving component for contact with a cell upper surface, and an elastic element integrated to the heat receiving component. The case includes a facing wall and standing walls and, facing wall facing the cell upper surface, wherein the standing walls and extend from the facing wall toward a plate portion of the elastic element. The elastic element serves for pressing the heat receiving component such that the heat receiving component comes into contact with the upper surface of the battery cell with an appropriate pressure, wherein the elastic element is formed with a rubber material. The elastic element includes a press-fit lock portion press-fitted into a holding hole in the facing wall, a plate portion with the FPC interposed between the plate portion and the heat receiving component, and an intermediate portion.

1 Claim, 9 Drawing Sheets

PRIOR ART

TEMPERATURE SENSOR ASSEMBLY

BACKGROUND OF THE INVENTION

Technical Field

The present invention relates to a temperature sensor assembly with a temperature sensor integrated to a case, wherein the temperature sensor is e.g. used for temperature detection of a cell of an in-vehicle battery.

Background Art

A battery for installation in a hybrid vehicle and/or electric vehicle is formed by a plurality of battery cells being connected in series in order to obtain a high voltage. In such a battery, a temperature sensor is mounted to the battery cell for temperature monitoring in order to prevent overcharging and/or overdischarging (see Patent Document 1).

FIG. 9 shows an example for a temperature sensor as mentioned above. This temperature sensor 500 includes an FPC 503, a metallic heat receiving component 505, and a resin section 506 integrated to the heat receiving component 505, the FPC 503 having a thermistor 504 mounted thereon, wherein the heat receiving component 505 surrounds the thermistor 504 and is in contact with a battery cell upper surface. The resin section 506 includes a pair of lock spring sections 561 configured to be locked to a case, wherein the case is configured to be attached to the battery upper surface.

In such a temperature sensor 500, the heat receiving component 505 comes into contact with the battery cell upper surface with an appropriate pressure due to a spring characteristic of the pair of lock spring sections 561 locked to the case.

CITATION LIST

Patent Literature

Patent Document 1: JP 2011-17638 A

SUMMARY OF THE INVENTION

For a temperature sensor assembly with the temperature sensor 500 integrated to the case, reduction of an installation space for the temperature sensor in the case, i.e., further miniaturization of the temperature sensor is desired and there is room for further improvement.

Therefore, an objective of the present invention is to miniaturize a temperature sensor.

According to the present invention, a temperature sensor assembly includes: a temperature sensor; and a case configured to be attached to the measured portion while holding the temperature sensor, wherein the case includes a facing wall configured to face the measured portion, the facing wall having a holding hole for the temperature sensor, wherein the temperature sensor includes: a flexible printed circuit board; a chip thermistor mounted on the flexible printed circuit board via surface mounting; a metallic heat receiving component configured to come into contact with the measured portion; and an elastic element integrated to the heat receiving component, wherein the elastic element includes: a press-fit lock portion press-fitted into the holding hole; a plate portion with the flexible printed circuit board interposed between the plate portion and the heat receiving component; and an intermediate portion between the press-fit lock portion and the plate portion, wherein the case includes a standing wall extending from the facing wall toward the plate portion.

The present invention enables a temperature sensor to be miniaturized, and enables an installation space for the temperature sensor in a case.

DETAILED DESCRIPTION OF THE PREFERRED EMBODIMENTS

A "temperature sensor assembly" according to an embodiment of the present invention will be described with reference to FIGS. 1 to 7.

Figure 1:
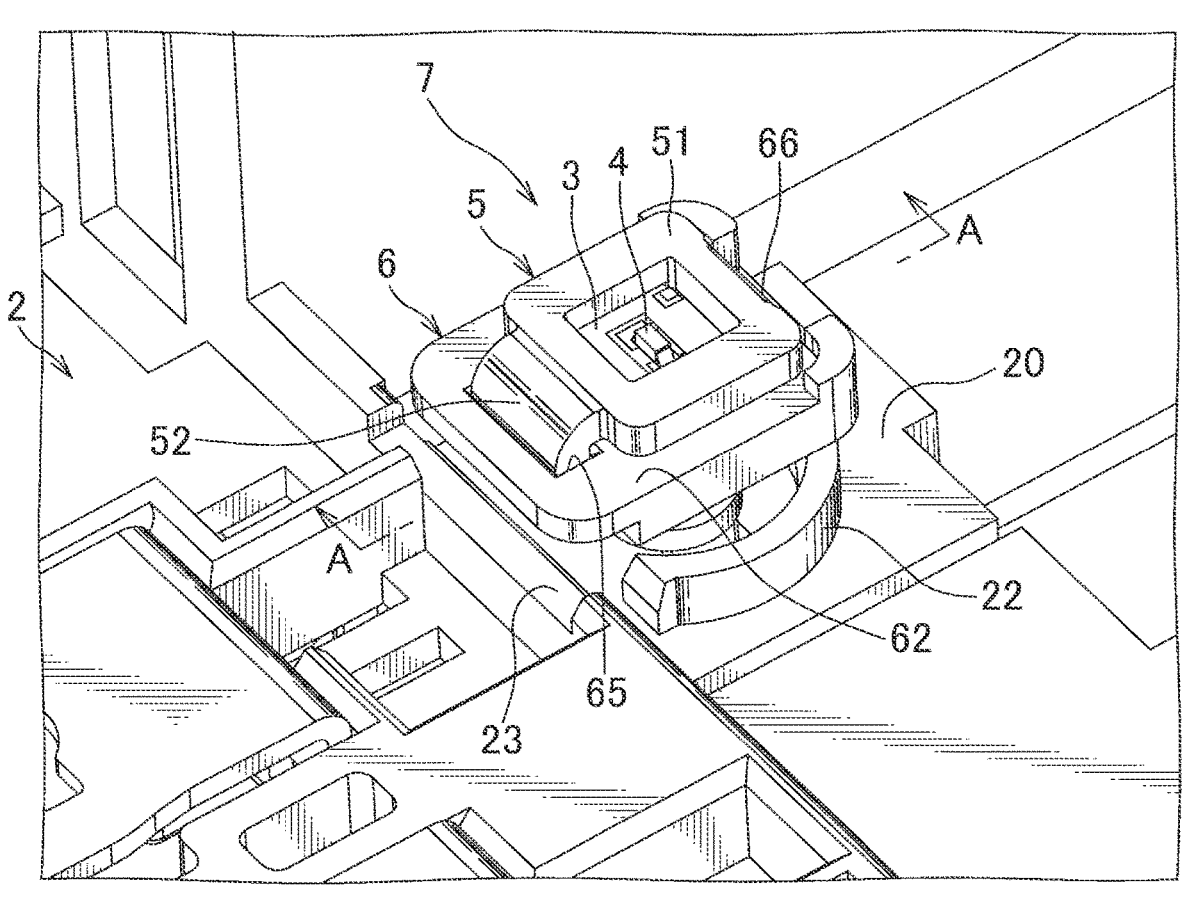
FIG. 1 shows a perspective view of a temperature sensor assembly according to an embodiment of the present invention.
Figure 2:
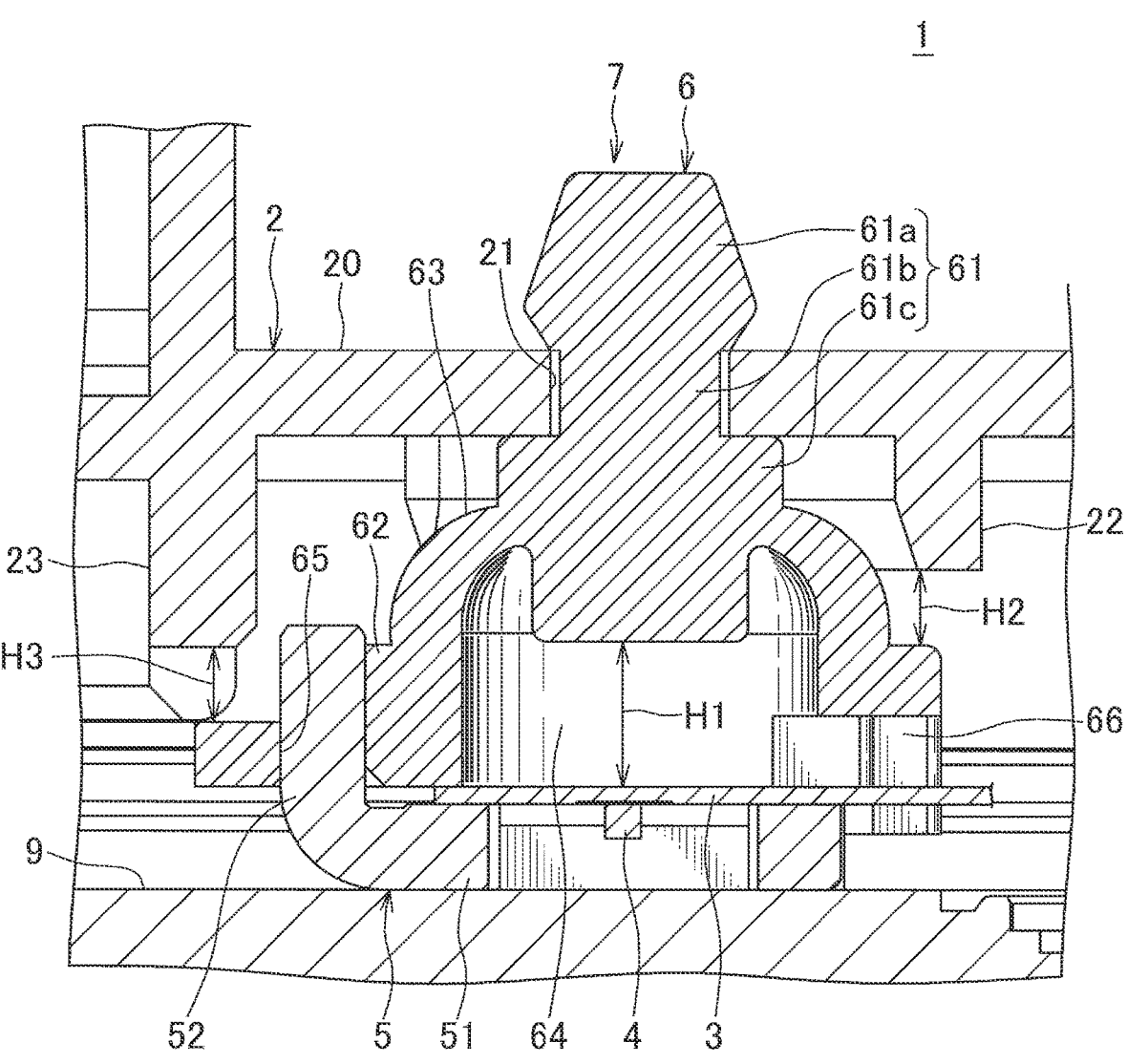
FIG. 2 shows a sectional view along the A-A line in FIG. 1.
Figure 3:
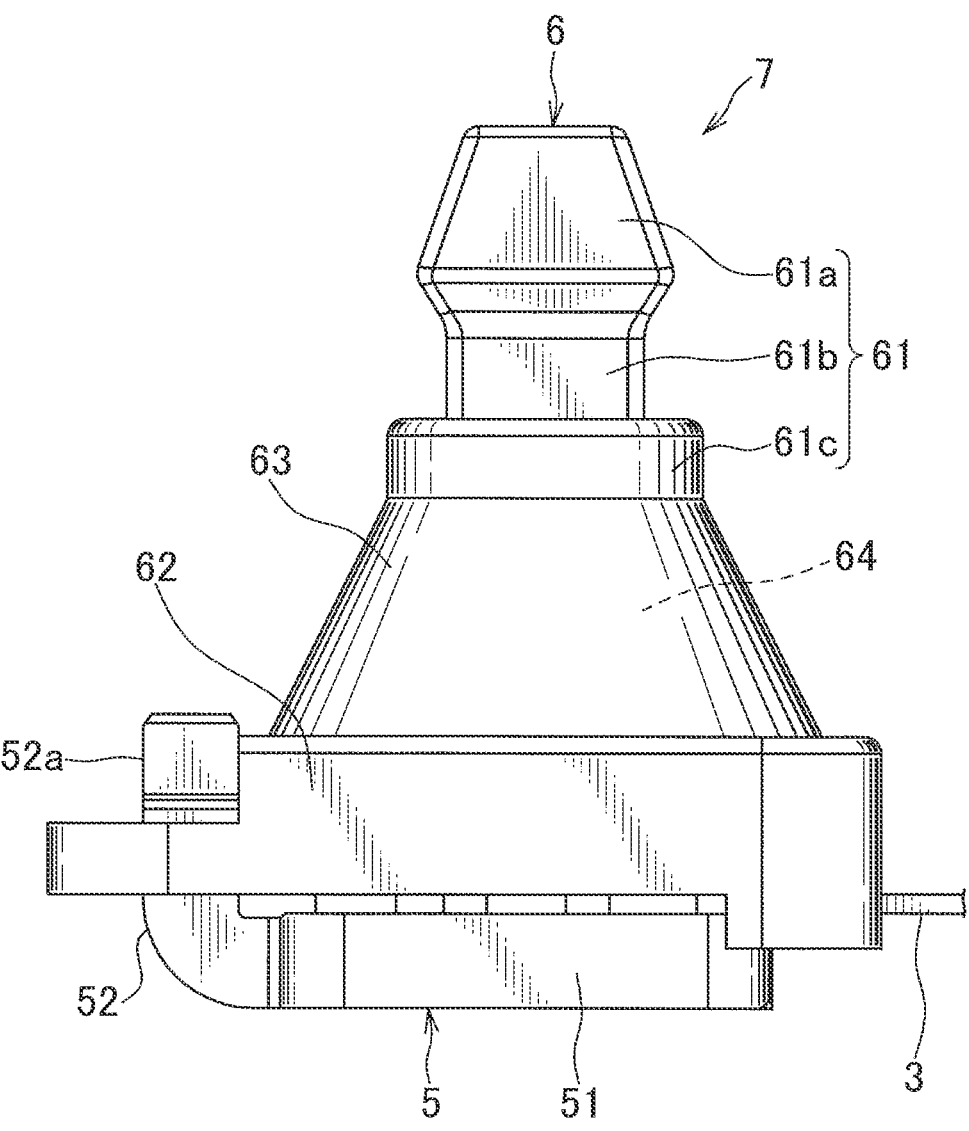
FIG. 3 shows a front view of a temperature sensor according to FIG. 1.
Figure 4:
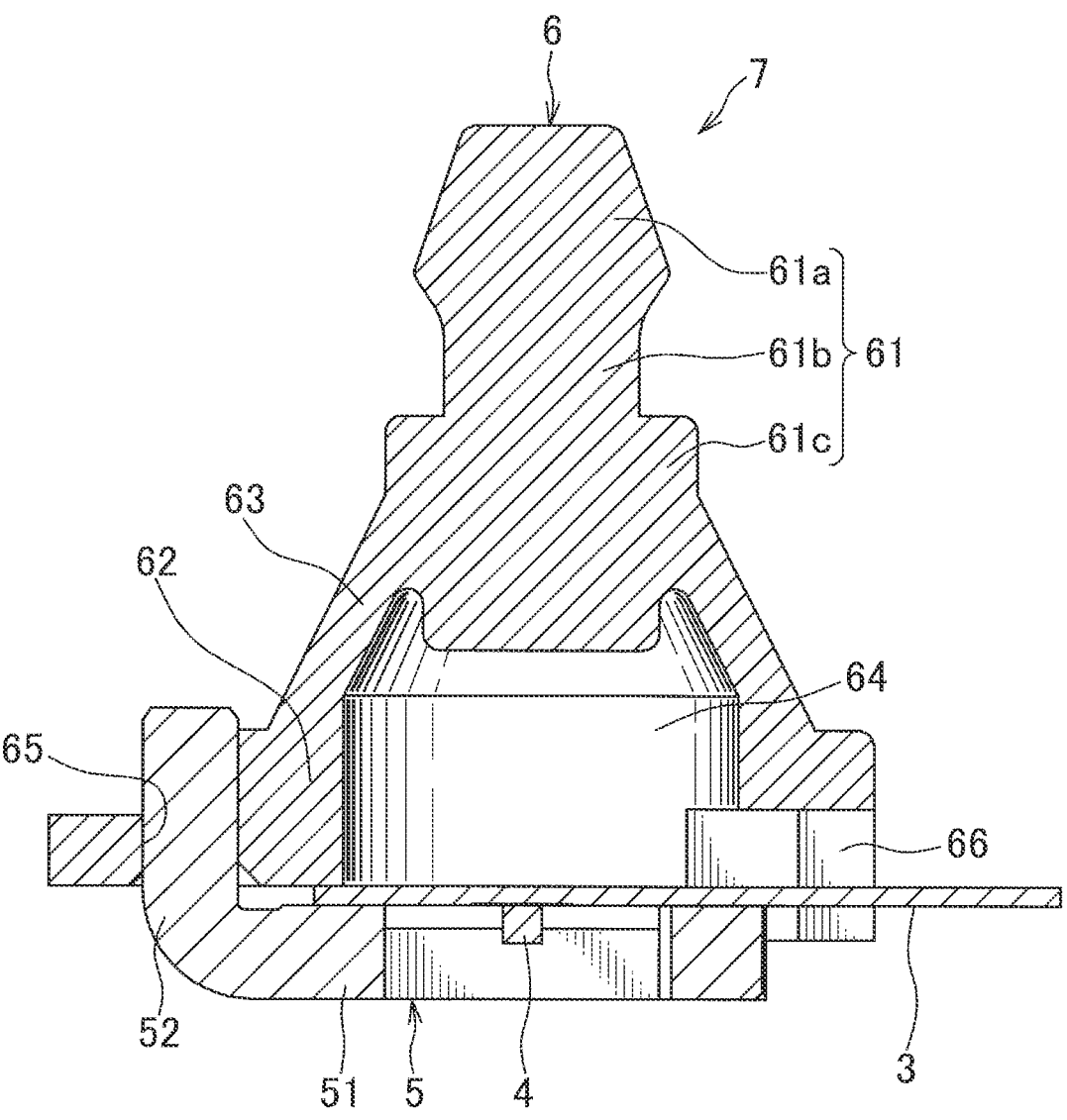
FIG. 4 shows a sectional view of the temperature sensor according to FIG. 3.

A temperature sensor 7 as shown in FIGS. 1 to 4 is used for temperature detection of a cell of a battery for installation to a hybrid vehicle or electric vehicle. The temperature sensor 7 is arranged on an upper surface (which corresponds to a measured portion) 9 of the battery cell, as shown in FIG. 2. The battery is formed by a plurality of battery cells connected in series, wherein a case 2 made of a resin is attached to the upper surface of the battery.

A plurality of temperature sensors 7 and/or a plurality of busbars are attached to the case 2, wherein the busbars connect the plurality of battery cells in series by connecting electrodes of adjacent battery cells to each other. In this manner, the "temperature sensor assembly" is formed by the temperature sensors 7 integrated to the case 2. In the present example, not only the plurality of temperature sensors 7 but also the plurality of busbars is attached to the case 2, and therefore, the resulting module shall be referred to as a "busbar module" and indicated by the reference sign 1. In other words, the busbar module 1 corresponds to the "temperature sensor assembly".

The temperature sensor 7 includes a flexible printed circuit board (hereinafter referred to as an "FPC") 3, a chip thermistor 4, a metallic heat receiving component 5, and an elastic element 6, the chip thermistor 4 being mounted on the FPC 3 via surface mounting, wherein the heat receiving component 5 is configured to come into contact with the upper surface 9 of the battery cell and the elastic element 6 is integrated to the heat receiving component 5.

The FPC 3 is configured in a well-known manner and includes a flexible and thin film with one or more circuits formed thereon. The FPC 3 is formed in a belt-shape, wherein the chip thermistor 4 is mounted on one end of the FPC 3 via surface mounting. Furthermore, this one end of the FPC 3 is joined to the heat receiving component 5. An opposite end of the FPC 3 is connected to a control unit for the battery. It is to be noted that in FIG. 1, a portion of the FPC 3 on the opposite end side is omitted which extends toward the control unit for the battery (extends toward the right side of FIG. 1).

The heat receiving component 5 includes a contact portion 51 and an attached portion 52, wherein the contact portion 51 is configured to come into contact with the upper surface 9 of the battery cell and the attached portion 52 is attached to the elastic element 6.

The contact portion 51 is formed in a quadrilateral frame shape, wherein the one end of the FPC 3 is interposed between the contact portion 51 and a plate portion 62 of the elastic element 6 which will be described below. Furthermore, the one end of the FPC 3 is joined to the contact portion 51 for mechanical fixture.

Figure 6:
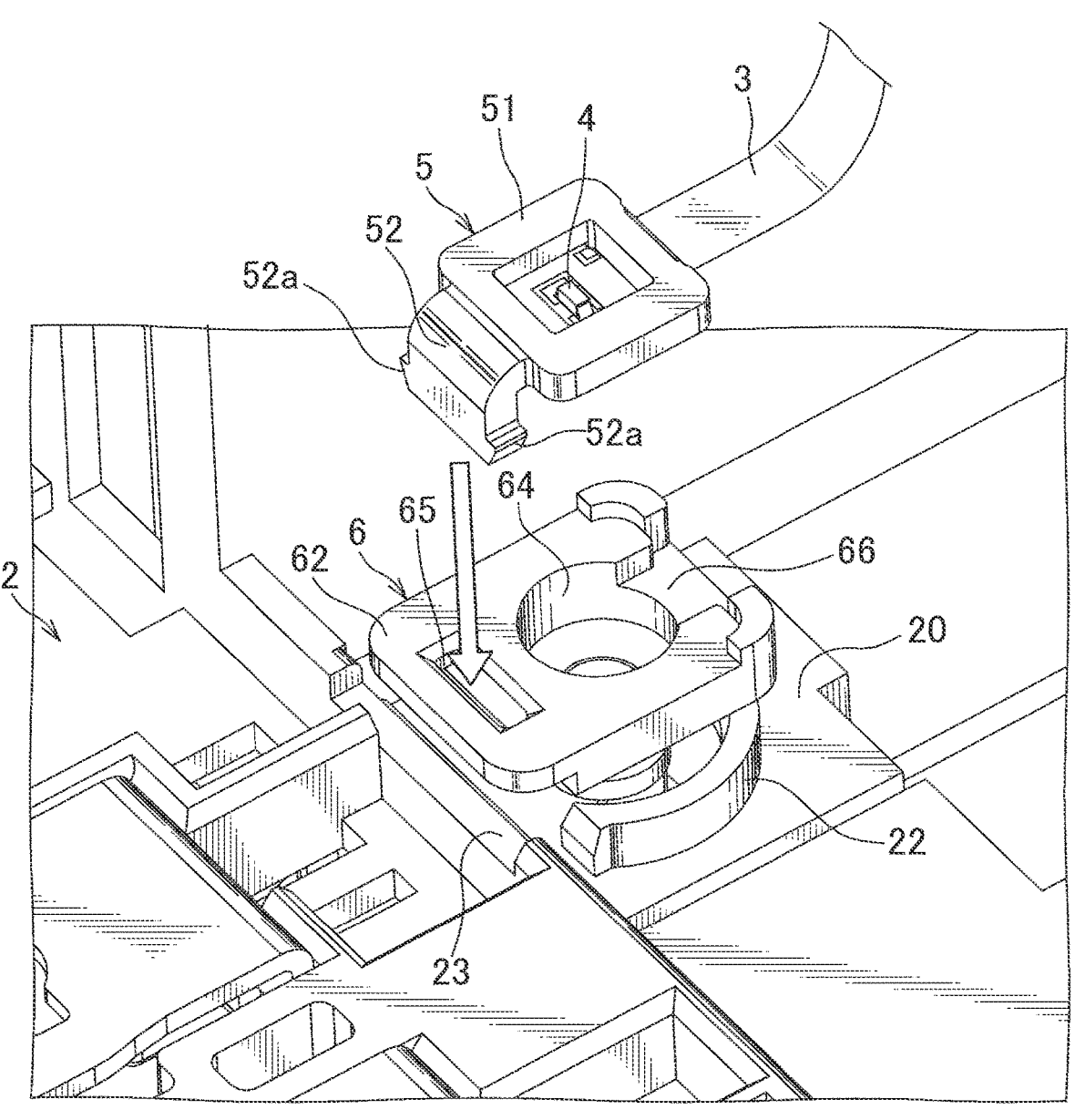
FIG. 6 shows how a heat receiving component is integrated to the elastic element which has been integrated to the case according to FIG. 5.

As shown in FIGS. 2 and 6, the attached portion 52 extends from an outer edge of the contact portion 51 toward the plate portion 62 of the elastic element 6 which will be described below. The attached portion 52 is press-fitted into a lock hole 65 formed in the plate portion 62. A retaining protrusion 52a is formed at a tip portion of the attached portion 52, wherein the retaining protrusion 52a serves for preventing the attached portion 52 from being removed out of the lock hole 65.

The elastic element 6 serves for pressing the heat receiving component 5 such that the heat receiving component 5 comes into contact with the upper surface 9 of the battery cell with an appropriate pressure. While a conventional cell temperature sensor is configured such that the above-mentioned pressing of a heat receiving component is achieved by means of a resin spring and/or coil spring, the temperature sensor 7 according to the present example uses the elastic element 6 as described below for miniaturization.

The elastic element 6 according to the present example is formed with a rubber material. As shown in FIGS. 2 to 5, the elastic element 6 includes a press-fit lock portion 61, the plate portion 62 and an intermediate portion 63, the press-fit lock portion 61 being press-fitted into a holding hole 21 in the case 2 which will be described below, wherein the one end of the FPC 3 is interposed between the plate portion 62 and the contact portion 51 of the heat receiving component 5, and the intermediate portion 63 is provided between the press-fit lock portion 61 and the plate portion 62.

The press-fit lock portion 61 includes a head portion 61a, a base portion 61c and a narrowed portion 61b, wherein the head portion 61a and base portion 61c are larger than the holding hole 21, and the narrowed portion 61b is smaller than the holding hole 21. The base portion 61c is connected to the intermediate portion 63, the narrowed portion 61b is connected to a side of the base portion 61c opposite to the intermediate portion 63, and the head portion 61a is connected to a side of the narrowed portion 61b opposite to the base portion 61c. The press-fit lock portion 61 is passed through the holding hole 21 with the head portion 61a being elastically deformed, wherein after passing through the holding hole 21, the head portion 61a is returned to its initial state from the deformed state to lock the press-fit lock portion 61 into the holding hole 21, as shown in FIG. 2.

The plate portion 62 is formed in a rectangular plate shape which is larger than an outer shape of the contact portion 51.

The lock hole 65 is formed in one end of the plate portion 62, wherein the attached portion 52 is press-fitted into the lock hole 65. A groove 66 is formed in an opposite end of the plate portion 62, wherein the FPC 3 is inserted through the groove 66.

As shown in FIGS. 1 and 2, the one end of the FPC 3 is interposed between the contact portion 51 and the plate portion 62, wherein the one end of the FPC 3 is oriented to bring a mounting side of the FPC 3 for mounting the chip thermistor 4 into contact with the contact portion 51 and to bring a back side of the FPC 3 into contact with the plate portion 62. In addition, the chip thermistor 4 is surrounded by the frame-shaped contact portion 51 and faces the upper surface 9 of the battery cell.

The intermediate portion 63 is formed so as to have a conical outer shape, wherein the conical outer shape has a base facing the plate portion 62.

Such an elastic element 6 has a pressing function which is comparable with that of a resin spring and/or coil spring of a conventional cell temperature sensor, while miniaturization of the temperature sensor 7 and reduction in height of the temperature sensor 7 are achieved by the elastic element 6. Therefore, an installation space for the temperature sensor 7 in the case 2 has a reduced dimension in a height direction of the installation space (dimension in a facing direction in which a facing wall 20 and the battery cell upper surface 9 face each other) as compared with conventional ones.

Furthermore, the elastic element 6 has a cavity 64 formed therein such that the elastic element 6 is not in contact with a portion of the FPC 3, wherein the chip thermistor 4 is mounted on the portion of the FPC 3. In the present example, the cavity 64 is formed to extend from the plate portion 62 to the intermediate portion 63.

Figure 8:
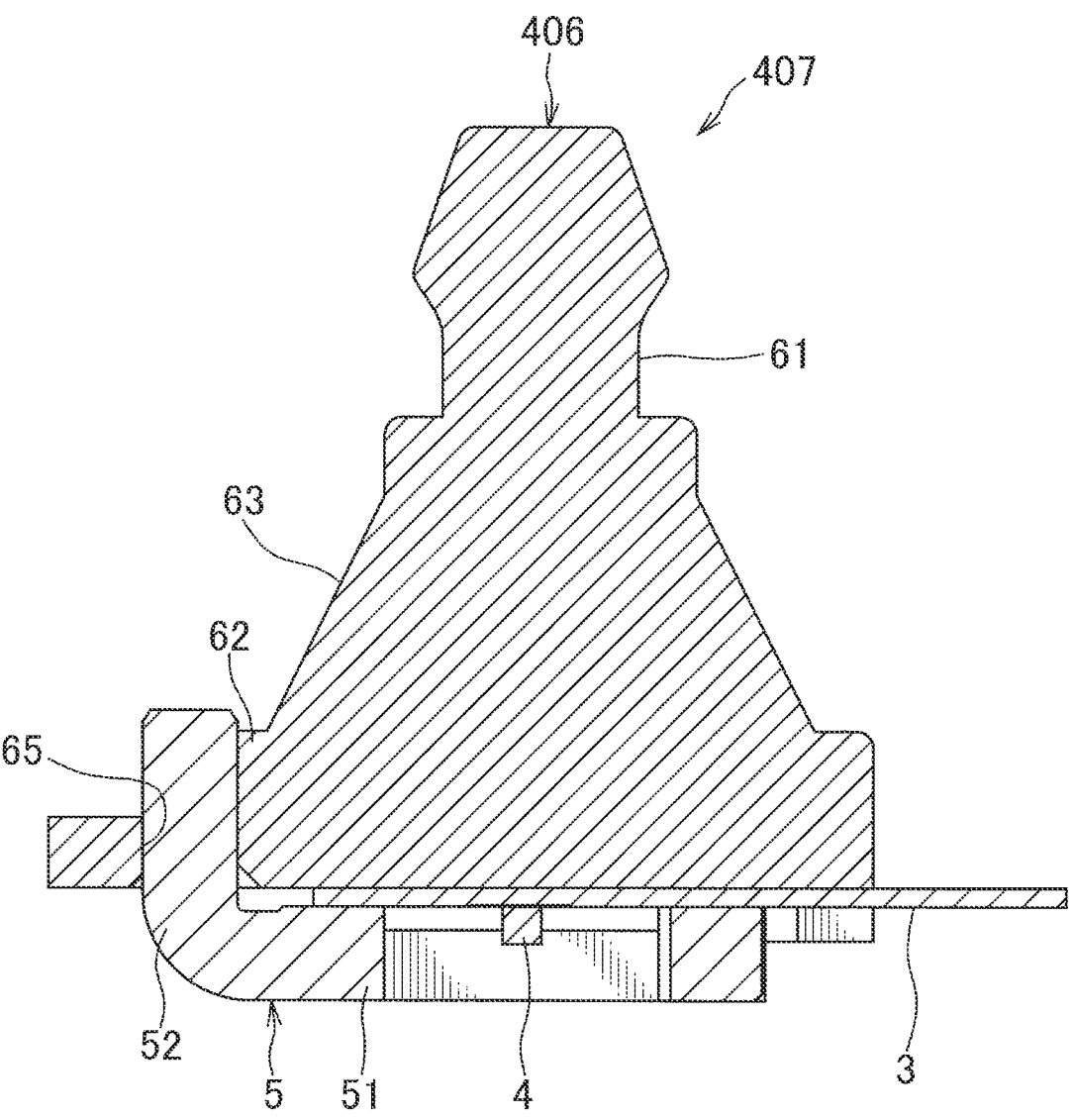
FIG. 8 shows a sectional view of a temperature sensor according to a reference example.
Figure 9:
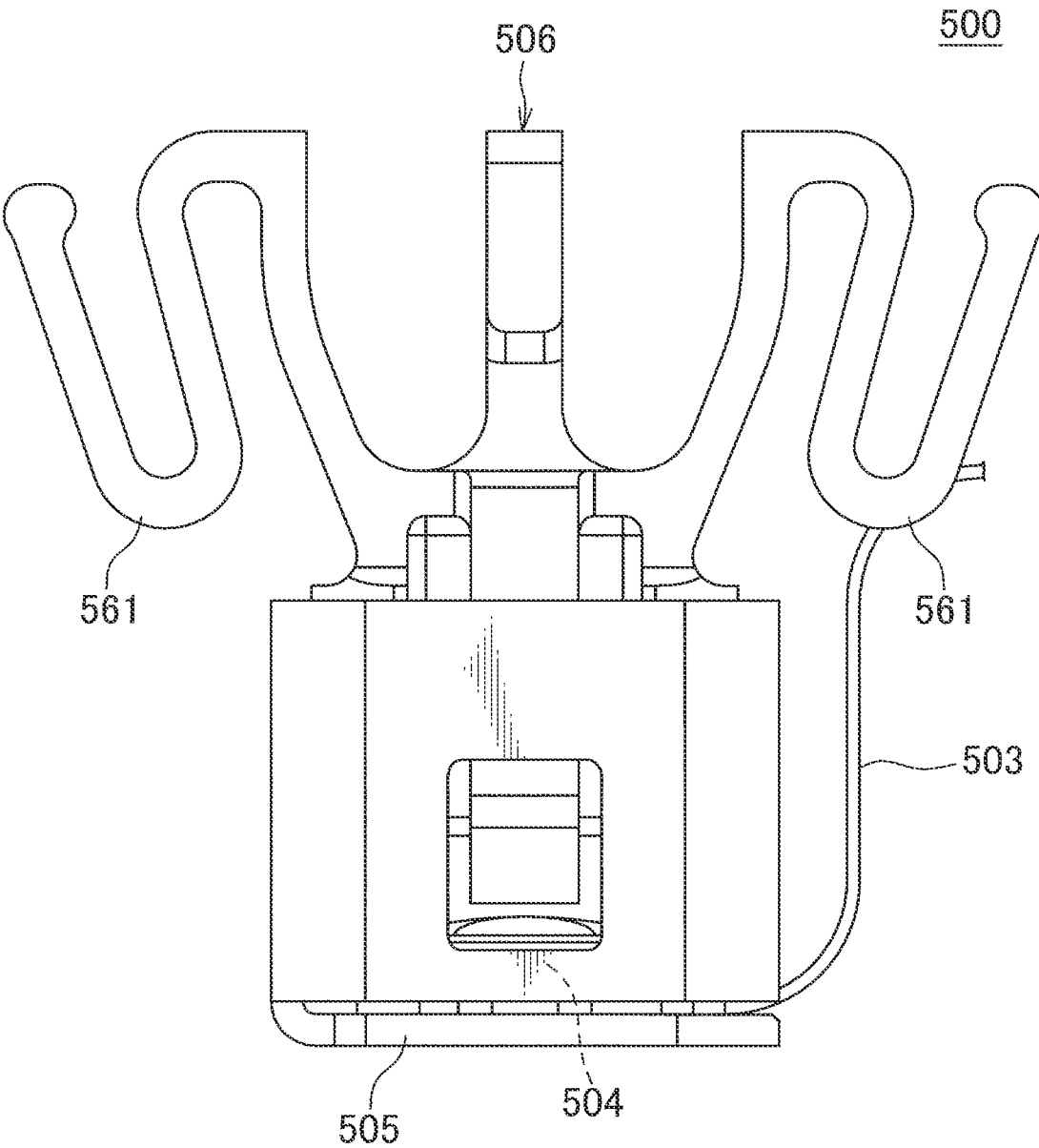
FIG. 9 shows a front view of a conventional temperature sensor.

FIG. 8 shows a reference example of a temperature sensor 407, which has no cavity 64 formed in an elastic element 406. In such a temperature sensor 407, the FPC 3 and the elastic element 406 are kept in a contact state with each other continuously so that a force is applied to the chip thermistor 4 continuously, whereby a crack may occur in the chip thermistor 4. In this regard, the temperature sensor 7 according to the above-described example has the cavity 64 therein so that no force is applied to the chip thermistor 4, which enables breakage of the chip thermistor 4 to be prevented.

The case 2 includes the facing wall 20 and standing walls 22 and 23, the facing wall 20 facing the upper surface 9 of the battery cell, wherein the standing walls 22 and 23 extend from the facing wall 20 toward the plate portion 62.

The facing wall 20 has the holding hole 21 formed therein into which the press-fit lock portion 61 of the temperature sensor 7 is locked. The holding hole 21 is a rectangular hole extending through the facing wall 20.

The standing wall 22 is formed in a C-shape at an outer circumference of the holding hole 21. This standing wall 22 faces an outer circumferential portion of the cavity 64 in the plate portion 62. The standing wall 23 is formed in a straight shape. This standing wall 23 faces an outer portion of the plate portion 62 which is positioned outside the lock hole 65.

As shown in FIG. 2, spaces H2 and H3 are provided between the standing wall 22 and the plate portion 62 and between the standing wall 23 and the plate portion 62 respectively in a state of the case 2 being attached to the upper surface 9 of the battery cell. The space H2 is as large as the space H3. Furthermore, in the state of the case 2 being attached to the upper surface 9 of the battery cell, the cavity 64 in the elastic element 6 has a height dimension (dimension along a direction extending from the facing wall 20 toward the plate portion 62) H1 which is larger than the spaces H2, H3.

Figure 5:
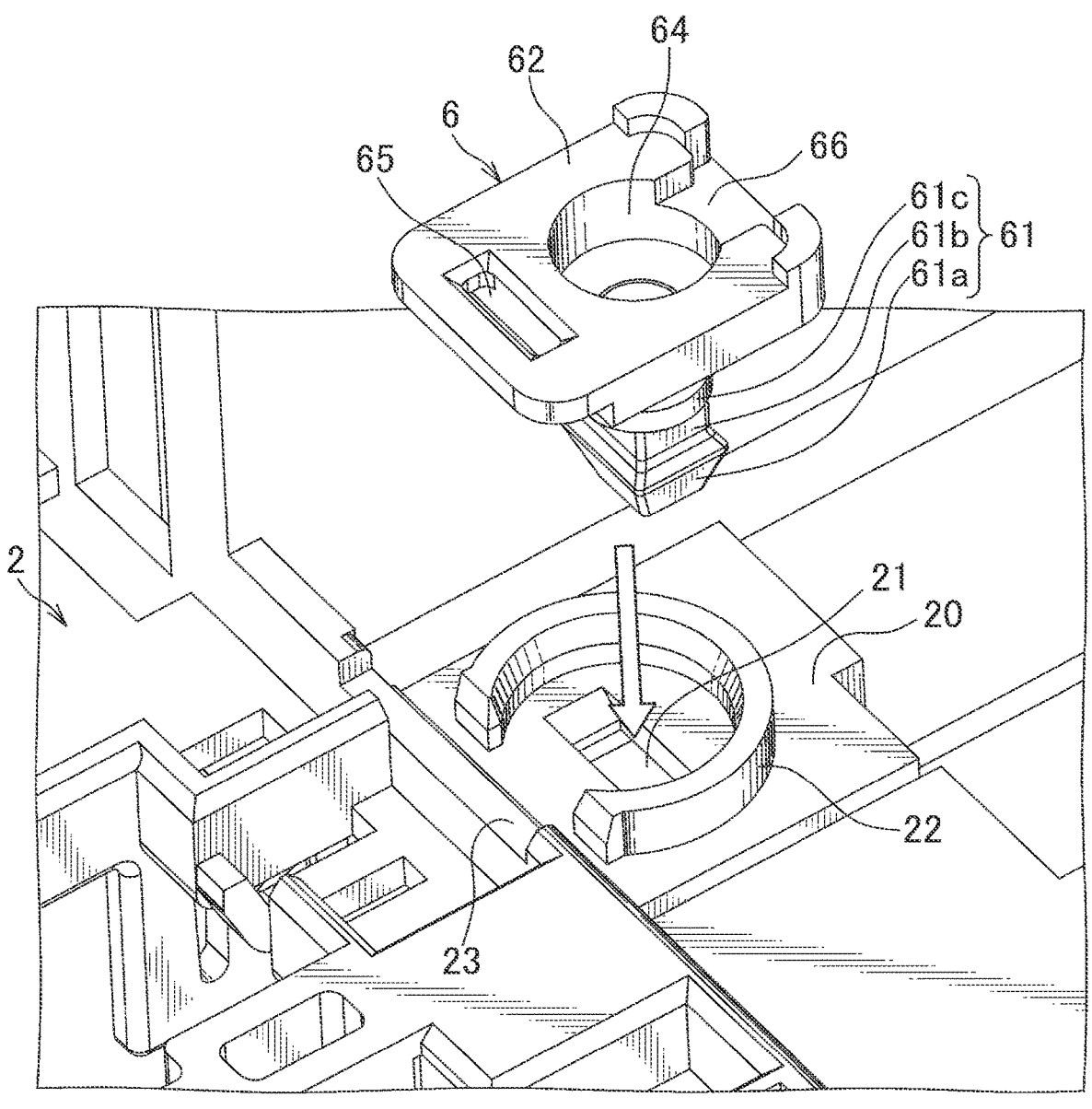
FIG. 5 shows a view for explanation of an assembling method of the temperature sensor assembly according to FIG. 1, illustrating how an elastic element is integrated to a case.

Subsequently, an example of an assembling method of the busbar module 1 will be described. First, the press-fit lock portion 61 of the elastic element 6 is press-fitted into the holding hole 21 in the case 2 to integrate the elastic element 6 to the case 2, as shown in FIG. 5. Next, the attached portion 52 of the heat receiving component 5 with the FPC 3 joined thereto is press-fitted into the lock hole 65 in the elastic element 6 integrated to the case 2, whereby the heat receiving component 5 is integrated to the elastic element 6, as shown in FIG. 6. A plurality of temperature sensors 7 is integrated to the case 2 with the above-described procedure, wherein a plurality of busbars is integrated to the case 2 to assemble the busbar module 1.

Figure 7:
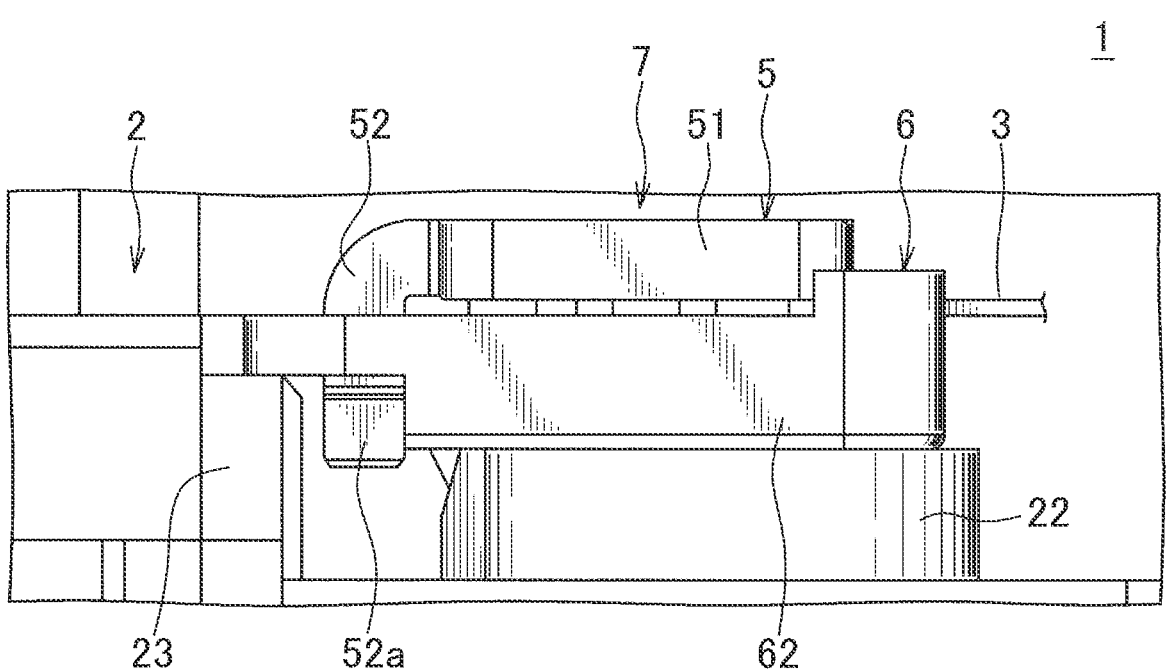
FIG. 7 shows a view for explanation of an effect of standing walls of the case during integrating the heat receiving component to elastic element according to FIG. 6.

As described above, during integrating the heat receiving component 5 to the elastic element 6, the elastic element 6 is elastically deformed by pressing the elastic element 6 against the heat receiving component 5. In other words, the elastic element 6 runs out of position during integrating the heat receiving component 5. In the case of the elastic element 6 running out of position, the integration would be difficult. However, the standing walls 22 and 23 support the elastic element 6 as shown in FIG. 7, wherein tip end faces of the standing walls 22 and 23 act as receiving faces for the elastic element 6. This enables elastic deformation of a portion of the elastic element 6 around the lock hole 65 to be suppressed, wherein movement of the elastic element 6 can be also suppressed and press-fitting the attached portion 52 into the lock hole 65 is facilitated.

According to FIG. 7, a force is applied to the elastic element 6 to elastically deform it temporarily so that the plate portion 62 comes into contact with the standing walls 22 and 23. However, once the heat receiving component 5 has been integrated to the elastic element 6, the elastic element 6 is returned to its initial state from the elastically deformed state so that the plate portion 62 is spaced from the standing walls 22 and 23.

Furthermore, when the busbar module 1 is attached to a battery, operation is performed for pressing the busbar module 1 against the battery upper surface, which results in compression of the elastic element 6 in a direction toward the upper surface. In other words, stroke of the elastic element 6 occurs in the direction toward the upper surface 9. However, due to the cavity 64 in the elastic element 6, the elastic element 6 does not come into contact with the portion of the FPC 3 with the chip thermistor 4 mounted thereon. When a larger stroke of the elastic element 6 occurs than expected, the standing walls 22 and 23 come into contact with the plate portion 62 so that a further stroke of the elastic element 6 is limited. More specifically, due to the height dimension H1 of the cavity 64 being larger than the spaces H2 and H3 between the standing walls 22 and 23 and the plate portion 62 as described above, the elastic element 6 does not come into contact with the portion of the FPC 3 even when the stroke of the elastic element 6 occurs, whereby no force may be applied to the chip thermistor 4.

In addition, inclination of the temperature sensor 7 is limited due to the standing walls 22 and 23 also in an installed state of the busbar module 1 on the battery. More specifically, even when some external force is applied after attaching the busbar module 1, strokes of the elastic element 6 are limited by the standing walls 22 and 23 in a similar manner as during attaching the busbar module 1 so that inclination of the temperature sensor 7 is limited.

In this manner, the busbar module 1 with the temperature sensor 7 has the installation space for the temperature sensor 7 in the case 2 which has a smaller extension in the height as compared with conventional busbar modules. Furthermore, the cavity 64 and the standing walls 22 and 23 are utilized as a structure for preventing breakage of the chip thermistor 4. Moreover, the standing walls 22 and 23 serve as a structure for facilitating assembly of the busbar module 1, and additionally limits inclination of the temperature sensor 7 after the assembly.

It is to be noted that the embodiments as described above merely illustrate representative examples for the present invention, and the present invention is not limited to these embodiments. I.e., various modifications may be performed without departing from the core of the present invention. It is obvious that such modifications are included in the scope of the present invention as far as the modifications comprise the features of the present invention.

REFERENCE SIGNS LIST

1 Busbar module (temperature sensor assembly)
2 Case
3 Flexible printed circuit board
4 Chip thermistor
5 Heat receiving component
6 Elastic element
7 Temperature sensor
9 Upper surface of the battery cell (measured portion)
20 Facing wall
22, 23 Standing walls
61 Press-fit lock portion
62 Plate portion
63 Intermediate portion
64 Cavity

What is claimed is:

1. A temperature sensor assembly comprising:
a temperature sensor; and
a case configured to be attached to a measured portion while holding the temperature sensor,
wherein the case includes a facing wall configured to face the measured portion, the facing wall having a holding hole for the temperature sensor,
wherein the temperature sensor includes:
a flexible printed circuit board;
a chip thermistor mounted on the flexible printed circuit board via surface mounting;
a metallic heat receiving component configured to come into contact with the measured portion; and
an elastic element integrated to the heat receiving component,
wherein the elastic element includes:
a press-fit lock portion press-fitted into the holding hole;
a plate portion with the flexible printed circuit board interposed between the plate portion and the heat receiving component; and
an intermediate portion between the press-fit lock portion and the plate portion;
wherein the case includes a standing wall extending from the facing wall toward the plate portion;
wherein the heat receiving component includes:
a contact portion configured to come into contact with the measured portion, wherein the flexible printed circuit board is interposed between the contact portion and the plate portion; and an attached portion extending from an outer edge of the contact portion toward the plate portion;

wherein the plate portion has a lock hole therein; and wherein the attached portion is press-fitted into the lock hole.

* * * * *